(12) United States Patent
Jiang et al.

(10) Patent No.: US 12,251,903 B2
(45) Date of Patent: Mar. 18, 2025

(54) CURVED ORIGAMI-BASED METAMATERIAL, MANUFACTURING METHOD OF THE SAME, CURVED ORIGAMI-BASED HAPTIC MODULE AND METHOD FOR PRODUCING ACTIVE MECHANICAL HAPTICS

(71) Applicant: WESTLAKE UNIVERSITY, Hangzhou (CN)

(72) Inventors: Hanqing Jiang, Hangzhou (CN); Zhuang Zhang, Hangzhou (CN); Luoqian Emu, Hangzhou (CN); Zhenghao Xu, Hangzhou (CN)

(73) Assignee: WESTLAKE UNIVERSITY, Hangzhou (CN)

( * ) Notice: Subject to any disclaimer, the term of this patent is extended or adjusted under 35 U.S.C. 154(b) by 0 days.

(21) Appl. No.: 18/284,847

(22) PCT Filed: Dec. 22, 2022

(86) PCT No.: PCT/CN2022/141058
§ 371 (c)(1),
(2) Date: Sep. 28, 2023

(87) PCT Pub. No.: WO2023/142806
PCT Pub. Date: Aug. 3, 2023

(65) Prior Publication Data
US 2024/0293991 A1    Sep. 5, 2024

(51) Int. Cl.
*B31D 5/04*     (2017.01)
*B25J 13/02*    (2006.01)
*G06F 3/01*     (2006.01)

(52) U.S. Cl.
CPC .............. *B31D 5/04* (2013.01); *B25J 13/025* (2013.01); *G06F 3/014* (2013.01); *G06F 3/016* (2013.01)

(58) Field of Classification Search
CPC .......... B31D 5/04; B25J 13/025; G06F 3/014; G06F 3/016; G06F 3/011
See application file for complete search history.

(56) References Cited

U.S. PATENT DOCUMENTS 8,584,456 B1 * 11/2013 McKnight .............. H02N 10/00
60/527
9,635,764 B2 *  4/2017 Qiu ...................... H05K 1/0278
(Continued)

FOREIGN PATENT DOCUMENTS

CN      109483959 A      3/2019

OTHER PUBLICATIONS

International Search Report and Written Opinion, International Application No. PCT/CN2022/141058, mailed on Jun. 23, 2023.

*Primary Examiner* — William Lu
(74) *Attorney, Agent, or Firm* — MARSHALL, GERSTEIN & BORUN LLP

(57) ABSTRACT

Curved origami-based meta-material, manufacturing method of the same, curved origami-based haptic module and a method for producing active mechanical haptics. The curved origami-based metamaterial includes a panel having a single curved crease extending in its longitudinal direction, which divides the panel into two facets at its two opposite sides. The panel is configured to be folded along the single curved crease to form a folding angle between the two facets. The folding angle is configured to be adjustable to achieve a variable stiffness when loaded in a vertical direction of the folded panel, covering positive stiffness to negative stiffness.

32 Claims, 8 Drawing Sheets

(56) References Cited

U.S. PATENT DOCUMENTS

| | | | | |
|---|---|---|---|---|
| 10,538,028 B2* | 1/2020 | Rogers | B32B 27/283 |
| 10,696,428 B2* | 6/2020 | Pellegrino | B64G 1/2224 |
| 10,833,392 B1* | 11/2020 | Zekios | H01Q 15/0013 |
| 10,994,468 B2* | 5/2021 | Choma | B29C 70/30 |
| 11,028,895 B2* | 6/2021 | Yang | F16F 3/02 |
| 11,530,731 B2* | 12/2022 | Wu | G10K 11/162 |
| 11,682,822 B1* | 6/2023 | Johnson | H01Q 13/10 |
| | | | | 343/709 |
| 2005/0281928 A1* | 12/2005 | Crowley | B65D 81/389 |
| | | | | 426/393 |
| 2007/0023987 A1* | 2/2007 | Kling | B31D 3/002 |
| | | | | 270/32 |
| 2014/0230572 A1* | 8/2014 | Mankame | G01L 1/04 |
| | | | | 73/862.621 |
| 2016/0039164 A1* | 2/2016 | Tuczek | B31D 3/005 |
| | | | | 428/116 |
| 2016/0040657 A1* | 2/2016 | Felton | B32B 27/281 |
| | | | | 60/527 |
| 2016/0376037 A1* | 12/2016 | Pellegrino | H02J 3/381 |
| | | | | 244/159.4 |
| 2017/0157777 A1* | 6/2017 | Hopkins | B25J 13/08 |
| 2017/0182723 A1* | 6/2017 | Calisch | F21V 1/18 |
| 2017/0362414 A1* | 12/2017 | Pasini | C08L 7/02 |
| 2018/0072014 A1* | 3/2018 | Dudte | B31D 5/04 |
| 2018/0155018 A1* | 6/2018 | Kovac | B64U 30/26 |
| 2018/0198009 A1* | 7/2018 | He | H01L 31/1876 |
| 2018/0278200 A1* | 9/2018 | Jeon | H02S 30/20 |
| 2018/0281341 A1* | 10/2018 | Granberg | B65D 65/406 |
| 2018/0348025 A1* | 12/2018 | Jahromi | G01D 21/00 |
| 2019/0112191 A1* | 4/2019 | Martinez-Duarte | B29C 53/04 |
| 2019/0381725 A1* | 12/2019 | Lu | C04B 35/5603 |
| 2020/0025272 A1* | 1/2020 | Jahromi | F16F 1/025 |
| 2020/0069917 A1* | 3/2020 | Laby | A61M 25/10181 |
| 2020/0370615 A1* | 11/2020 | Calisch | B29D 16/00 |
| 2021/0061495 A1* | 3/2021 | Aston | B22F 3/1115 |
| 2021/0232308 A1* | 7/2021 | Cruz Hernandez | |
| | | | G06F 3/04886 |
| 2021/0320269 A1* | 10/2021 | Yu | H10K 59/131 |
| 2022/0097240 A1* | 3/2022 | Jiang | B63B 35/00 |
| 2022/0205508 A1* | 6/2022 | Wu | G10K 11/172 |
| 2022/0249817 A1* | 8/2022 | Zhao | A61M 37/00 |
| 2022/0350147 A1* | 11/2022 | Ouderkirk | G02B 27/0093 |
| 2024/0201031 A1* | 6/2024 | Kao | G01L 1/142 |

* cited by examiner

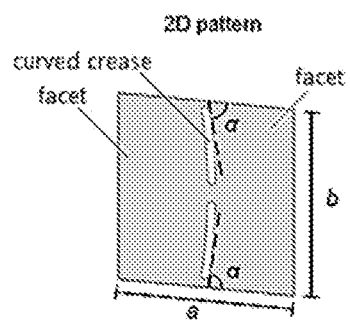
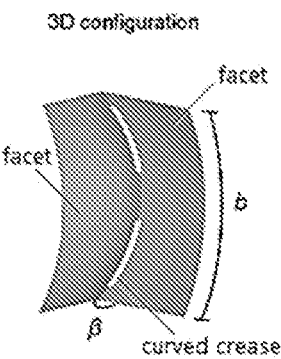
FIG.1a  FIG.1b
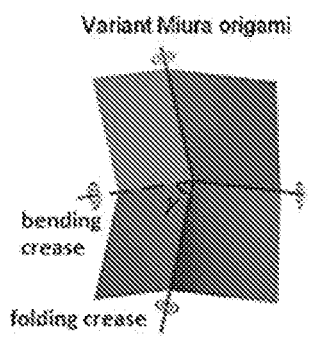
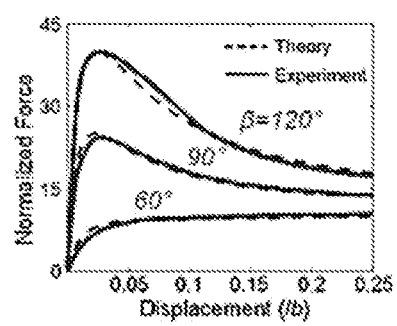
FIG.2a  FIG.2b
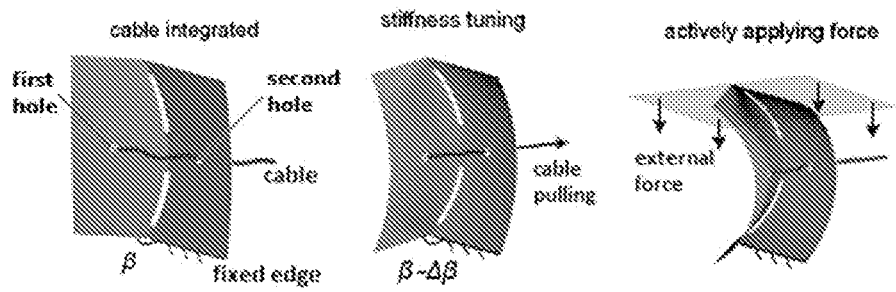
FIG.3a  FIG.3b  FIG.3c

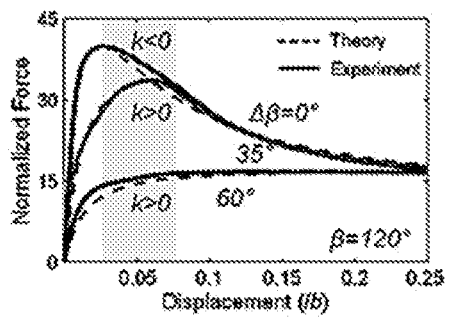
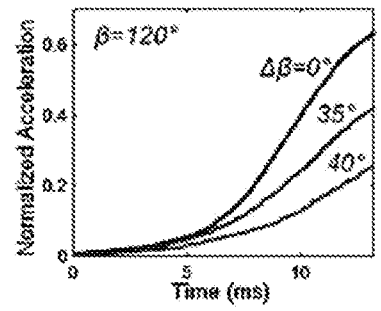
FIG.4a  FIG.4b
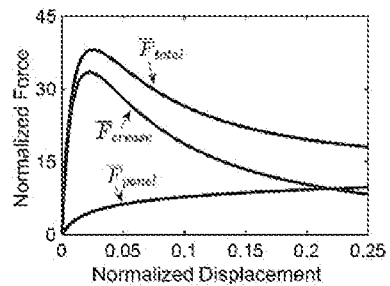
FIG.5a
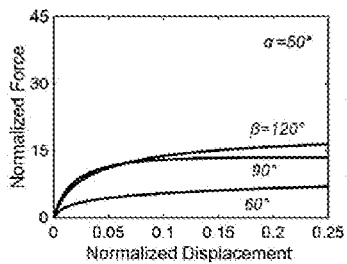
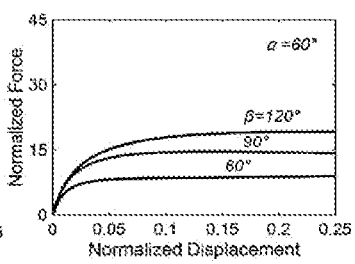
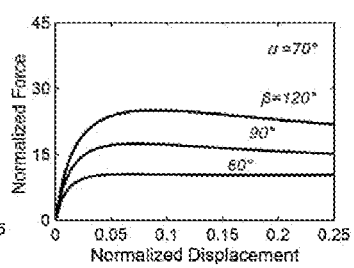
FIG.5b  FIG.5c  FIG.5d
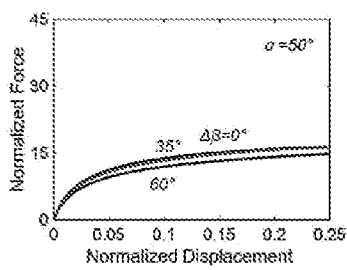
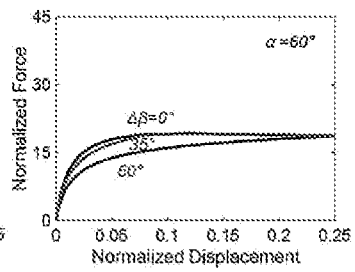
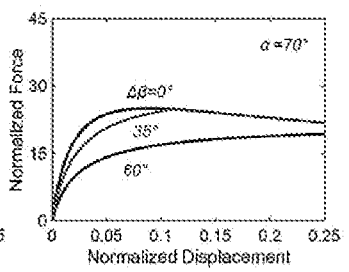
FIG.5e  FIG.5f  FIG.5g

# CURVED ORIGAMI-BASED METAMATERIAL, MANUFACTURING METHOD OF THE SAME, CURVED ORIGAMI-BASED HAPTIC MODULE AND METHOD FOR PRODUCING ACTIVE MECHANICAL HAPTICS

TECHNICAL FIELD

The present disclosure relates to curved origami-based meta-material, manufacturing method of the same, curved origami-based haptic module and method for producing active mechanical haptics.

BACKGROUND

The emerging metaverse powered by virtual reality (VR) and augmented reality (AR) technologies is transforming present digital media viewed in the third person to a future immersive platform that vividly represents the physical environment perceived in the first person. This is achieved by constructing a virtual environment with authentic sensory perceptions, including but not limited to sight, hearing, and touch. In this new paradigm of how humans engage with future media, VR/AR technologies are primed to permeate a range of industry sectors (e.g., entertainment, communication, education, human-machine interaction, teleoperation, clinical therapy, and rehabilitation), while aided by advanced software (i.e., communication technologies, various apps and social networks) and hardware (i.e., VR/AR and haptic devices) to enhance our VR/AR, haptic experiences. Although state-of-the-art VR/AR devices offer stereoscopic visual and audial sensory perceptions, they fail in delivering a concrete sensory dimension in the mechanical domain, namely, touch sensation. Substantial progress has been made to make the virtual world touchable by bringing passive haptic experiences to users; however, most produce simple and hand-centered motion constraints or vibrations (vibro-haptics). This is in stark contrast to the physical environment in which humans feel natural objects in terms of their hardness, softness, and even the broken moments of fragile ones through active touch via hands, feet, or other body parts.

Active mechanical haptics that cover positive stiffness (feeling hardness and softness) and negative stiffness (feeling broken and falling moments) are considered central to and part of the first sensory perceptions in a human's daily interactions with the physical environment for exploring/processing information and creating an ontological metaphor. Currently, these perceptions are missing in body-centered immersive environments. Research has shown that authentic and active mechanical haptics can lead to simultaneous physiological and psychological responses, which are difficult to trigger by visual and auditory stimuli alone. In fact, the touching sensation is remarkably very different from our visual and auditory perceptions, which are passive because we as humans receive the information as third persons. The touching sensation, on the other hand, is primarily active since the interaction initiated by actively touching/holding an object creates a sense of psychological ownership, thereby generating intrapersonal and interpersonal concepts. Achieving a combination of visual, audial, and active touching sensory perceptions in AR/VR haptic experiences offers exciting potential for extending the realism of the virtual world.

The present disclosure is provided to solve the above-mentioned defects in the background.

SUMMARY

Therefore, there is a need for a curved origami-based meta-material, a manufacturing method of the same, a curved origami-based haptic module and a method for producing active mechanical haptics, which allows users to actively generate and sense mechanical touching sensations with controllable stiffness, ranging from hard to soft and from positive to negative.

The present disclosure provides a curved origami-based meta-material, a manufacturing method of the same, a curved origami-based haptic module and a method for producing active mechanical haptics, introducing the mechanisms, materials, design principles, systems integration, and corresponding sensory perceptions for human-initiated, body-centered, scalable, and wirelessly controlled haptic devices that are uniquely enabled by curved origami modules, allowing users to actively generate and sense mechanical touching sensations with controllable stiffness, ranging from hard to soft and from positive to negative. These active haptic mechanical devices aim to produce human-triggered mechanical sensory perception. These devices are expected to enhance the VR/AR experiences beyond visual and auditory sensations while delivering a range of diverse and immersive experiences.

In a first aspect of the present disclosure, a curved origami-based metamaterial comprises a panel having a single curved crease extending in its longitudinal direction, which divides the panel into two facets at its two opposite sides. The panel is configured to be folded along the single curved crease to form a folding angle between the two facets. The folding angle is configured to be adjustable to achieve a variable stiffness when loaded in a vertical direction of the folded panel, covering positive stiffness to negative stiffness.

In a second aspect of the present disclosure, a method of manufacturing a curved origami-based metamaterial comprises providing a substrate; cutting pattern of panels on the substrate so as to obtain panels, each of which has a single curved crease extending in the longitudinal direction, which divides the panel into two facets at its two opposite sides. The method further comprises folding each panel along the single curved crease to form a folding angle between the two facets. The method further comprises coupling a connecting member to each panel, the folding angle between the two facets is adjustable by means of driving the connecting member, so as to achieve a variable stiffness when loaded in a vertical direction of the folded panel, covering positive stiffness to negative stiffness.

In a third aspect of the present disclosure, a method of producing active mechanical haptics comprises providing the curved origami-based metamaterial of the first aspect of the present disclosure. The method further comprises presenting, by at least one processor, a virtual object in a virtual reality/augmented reality (VR/AR) scene for a user. The method further comprises enabling the user to load strain in a vertical direction of the folded panel and transforming the loaded strain to the user's interaction operation with the virtual object in the VR/AR scene. The method further comprises determining, by the at least one processor, the stiffness-related property of the virtual object under the user's interaction operation. The method further comprises adjusting, by the at least one processor, the folding angle in accordance with the determined stiffness-related property of the virtual object under the user's interaction operation, so as to achieve the stiffness corresponding to the determined stiffness-related property, covering positive stiffness to negative stiffness.

In a fourth aspect of the present disclosure, a curved origami-based haptic module comprises at least one curved origami-based metamaterial of the first aspect of the present disclosure. The curved origami-based haptic module further comprises at least one connecting member, wherein each panel is coupling to at least one connecting member, which is configured to be driven by a driving system to adjust the folding angle between the two facets of the corresponding panel, so as to achieve a variable stiffness when loaded in a vertical direction of the corresponding folded panel, covering positive stiffness to negative stiffness.

Other aspects of the disclosure will become apparent by consideration of the detailed description and accompanying drawings.

BRIEF DESCRIPTION OF THE DRAWINGS

In figures that are not necessarily drawn to scale, the same reference numerals may describe similar components in different figures. The same reference signs with suffixes or different suffixes may denote different examples of similar components. The figures generally show various embodiments by way of example rather than limitation, and are used together with the description and the claims to describe the embodiments of the present disclosure. Such embodiments are illustrative, and are not intended to be exhaustive or exclusive embodiments of the present device or method.

FIGS. 1a-1b shows the 2D pattern and 3D configuration of the curved origami-based metamaterial respectively according to an embodiment of the present disclosure respectively.

FIG. 2a shows the configuration of the variant Miura origami with straight creases and rigid panels for theoretical modeling of the curved origami according to an embodiment of the present disclosure.

FIG. 2b presents the force-displacement relationships of one curved origami and one variant Miura origami according to an embodiment of the present disclosure.

FIGS. 3a-3c shows working principle of the stiffness manipulation based on curved origami-based metamaterial respectively according to an embodiment of the present disclosure.

FIG. 4a shows the force-displacement relationships for a curved origami-based metamaterial under different tuning angles according to an embodiment of the present disclosure.

FIG. 4b shows dropping accelerations of a dead load in negative stiffness domain for different tuning angles according to an embodiment of the present disclosure.

FIG. 5a shows normalized force/displacement relationships with contributions from crease, panel, and the overall total effects according to an embodiment of the present disclosure.

FIGS. 5b-5g shows normalized force/displacement relationship of curved origami modules respectively according to an embodiment of the present disclosure.

DETAILED DESCRIPTION

Figures 6A, 6B:
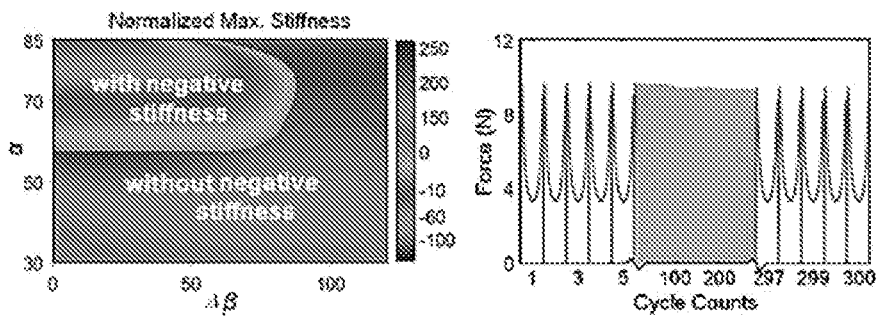
FIG. 6a shows the phase diagram of the normalized secant stiffness as the function of the crease angle and tuning angle according to an embodiment of the present disclosure.
FIG. 6b shows cyclic compression test of a curved origami module according to an embodiment of the present disclosure.

In order to enable those skilled in the art to better understand the technical solutions of the present disclosure, the present disclosure will be described in detail below in conjunction with the accompanying drawings and specific embodiments. The embodiments of the present disclosure will be described in further detail below in conjunction with the accompanying drawings and specific embodiments, but they are not intended to limit the present disclosure.

"First", "second" and similar words used in the present disclosure do not indicate any order, quantity or importance, but are only used to distinguish different components. "Include" or "comprise" and other similar words mean that an element appearing before this word covers an element listed after this word, but do not exclude other elements.

In addition, although exemplary embodiments have been described herein, the scope thereof includes any and all embodiments based on the present disclosure having equivalent elements, modifications, omissions, combinations (e.g., scenarios where various embodiments intersect), adaptations, or changes. The elements of the claims will be construed broadly based on the language employed in the claims and are not limited to the examples described in this specification or during implementation of this application, the examples of which will be construed as non-exclusive. Accordingly, this specification and the examples are intended to be considered as examples only and the true scope and spirit are indicated by the full scope of the following claims and their equivalents.

Configurations

FIG. 1a and FIG. 1b show the 2D pattern and 3D configuration of the curved origami-based metamaterial according to an embodiment of the present disclosure respectively. As shown in FIG. 1a and FIG. 1b, the curved origami-based metamaterial comprises a panel having a single curved crease extending in its longitudinal direction, which divides the panel into two facets at its two opposite sides. The panel is configured to be folded along the single curved crease to form a folding angle $\beta$ between the two facets (see FIG. 1b), wherein the folding angle is configured to be adjustable to achieve a variable stiffness when loaded in a vertical direction of the folded panel, covering positive stiffness to negative stiffness.

In a preferable embodiment, the single curved crease is configured by a circular arc-shaped cutting slot at a portion thereof, as shown in FIG. 1a. More preferably, the single curved crease is configured by the following portions: two end extending portions, an intermediate extending portion, and two circular arc-shaped cutting slots, each of which connects its adjacent end extending portion and the intermediate extending portion.

As shown in FIG. 1a, each of the circular arc-shaped cutting slots includes a cutting line, wherein, α is the angle between the normal line at the midpoint of the curved crease and the tangent line at the end of the curved crease and denotes the normalized curvature of the crease; β is the angle between two bending panels (i.e., folding angle) and represents the plastic origami folding. By simply introducing the circular arc-shaped cutting line characterized by the angle α that is related to the radius of the circle $$\rho \text{ by } \cos\alpha = \frac{b}{2\rho},$$

where a×b is the geometry of the rectangular plate, a curved origami is formed by folding the 2D panel along the curved crease. The folding angle β between the two facets, shown in FIG. 1b, is determined by the plasticity imposed by the folding process, with smaller β for larger bending deformation on the curved panels and larger β for smaller bending deformation.

As described above, for the purpose of illustration, a 2D panel of rectangular shape is adopted in FIG. 1a and FIG. 1b. However, the shape of the panel is not limited to this, and other shapes can also been employed, such as circle, square or ellipse. In the case of any of above types of shape, however, the curving angle between the normal line at the midpoint of the curved crease and the tangent line at the end of the curved crease (angle α) is fixed. In the specific example illustrated in FIG. 1a, the angle α between the horizontal edge and the tangent line at the end of the curved crease is fixed.

The curved origami belongs to the class of deformable origami and thus it has infinite degrees of freedom. Instead of using finite element methods to obtain spatial distribution of stress and strain upon deformation, an analytical analysis by bridging the curved origami (deformable origami) with a variant Miura origami (rigid origami) shown in FIG. 2a is adopted, both in geometry and in mechanics, so as to analytically detail the mechanical behavior of the curved origami. FIG. 2a shows the configuration of the variant Miura origami with straight creases and rigid panels for theoretical modeling of the curved origami, where angle γ is related to the plastic folding angle β, i.e., γ(β), which is then adopted to predict the stiffness of the curved origami and guide the design choices. The solid lines represent mountain creases, and the dash lines represent valley creases. Upon application of a vertical load on top of the origami, the curved origami exerts different force-displacement relationships depending on the competition between the bending deformation providing positive stiffness, and the folding deformation about the curved crease providing negative stiffness. FIG. 2b presents the force-displacement relationships of one curved origami and one variant Miura origami defined by α=80° and a/b=1.25 under different folding angle β (i.e., initial states) for 60°, 90°, and 120°, wherein the horizontal axis denotes pressed vertical displacement caused due to application of a vertical load on top of the origami while the vertical axis denotes normalized force generated accordingly by the folded panel.

In a preferable embodiment, the folded panel is configured to exhibit both positive and negative stiffness when the folding angle β is in a first angle range while exhibit only positive stiffness when the folding angle β is in a second angle range, wherein the first angle range is larger than the second angle range meanwhile larger than an angle threshold. For example, it can be seen from FIG. 2b that the folded panel exhibits both positive and negative stiffness when the folding angle β is 90° or 120° while exhibits only positive stiffness when the folding angle β is 60°.

Further, in the embodiment, the folded panel is configured to exhibit negative stiffness when the pressed vertical displacement is more than a first displacement threshold but exhibit positive stiffness when the pressed vertical displacement is less than the first displacement threshold, in case that the folding angle β is in the first angle range. For example, when the folding angle β is 120°, the normalized force increases (positive stiffness) and then decreases (negative stiffness) with the displacement.

Thus, for a given curved origami (i.e., given angle α), the stiffness can be readily tuned by changing the folding angle β using the curved origami-based metamaterial, for example, through a connecting member-driven method as shown in FIGS. 3a-3c, wherein the connecting member is configured to include, for example, a cable connecting the two facets. Specifically, FIG. 3a shows the initial state of the curved origami-based metamaterial with an integrated cable and a fixed edge, wherein a first hole is cut in one of the two facets while a second hole is cut in the other of the two facets, for the cable to pass through the two holes consequently, e.g, with a knotted portion of the cable being inhibited by the first hole, so as to perform pulling operation for decreasing the folding angle or releasing operation for increasing the folding angle. FIG. 3b shows that the cable is utilized to change the folding angle β by Δβ through pulling operation. FIG. 3c shows that upon actively pressing the curved origami vertically, the combined panel-bending and origami folding defines its stiffness.

FIG. 4a shows the force-displacement relationships for a curved origami-based metamaterial, with α=80°, β=120°, and a/b=1.25, under different cable pulling angles Δβ=0°, 35° and 60° through the cable pulling method illustrated in FIGS. 3a-3c, exhibiting stiffness spanning positive and negative ranges. This establishes the efficacy of using a cable-driven method to tune the stiffness of curved origami in real-time. As for haptic perceptions, different values of positive stiffness reflect levels of hardness, while negative stiffness mimics the feeling of crushing an object or of falling. Thus, during the process of actively pressing a curved origami with negative stiffness from a constant force, its acceleration becomes an essential metric for characterizing this feature. For the same curved origami in FIG. 4a under β=120° and Δβ=0°, 35° and 40°, the acceleration of a dead load (i.e., a constant force) can be as high as 0.6 G (with 1 G for free falling) as shown in FIG. 4b.

In addition to the folding angle β as discussed above, the stiffness of the folded panel changes can be as a function of the material of the panel, the geometry of the panel, the arrangement of the cutting slots, and the curving angle α between the normal line at the midpoint of the curved crease and the tangent line at the end of the curved crease.

For example, FIG. 5a illustrates normalized force/displacement relationship with contributions from crease, panel, and the overall total effects. As shown in this figure, the creases and the panels provide negative stiffness and positive stiffness, respectively. Obviously, the mechanical responses of the curved origami can be designed on demand by appropriately allocating the creases and panels. FIGS. 5b-5d illustrates normalized force/displacement relationship of curved origami modules with different initial folding angles β with angles α=50°, 60°, 70° respectively. FIGS. 5e-5g illustrates normalized force/displacement relationship of curved origami modules with fixed initial folding angles β=120° and different controllable angles Δβ, with different angles α=50°, 60°, 70° respectively.

To guide the design of the curved origami to achieve more pronounced mechanical perceptions, FIG. 6a provides the phase diagram of the normalized secant stiffness as the function of the crease angle α(30°<α<85°) and tuning angle Δβ for a prescribed initial folding angle β=120°, i.e., the actual angle with cable pulling, ranging from 0° to 120°. To harness the most pronounced stiffness perceptions, when the origami has both positive and negative stiffness ranges, only the maximum negative stiffness is chosen. When it has only the positive stiffness range, the maximum positive stiffness is adopted. From a practical perspective, angle α is a pre-determined parameter as it defines the curved origami pattern. Consequently, this phase diagram provides a design (through angle α) and an operation guide (through tuning angle Δβ) to utilize curved origami for stiffness sensory perceptions. For example, to obtain both positive stiffness and negative stiffness, the curving angle α between the tangent line at the end of curved crease and the normal line at the midpoint of the curved crease is set in a range between 55° and 85°, and the folding angle β is adjusted between 30° and 130°.

Similar to elastic deformation during cable pulling, the deformation during cyclic pressing on top of the curved origami is also elastic (FIG. 6b), in which both negative and positive stiffness can be clearly seen in each cycle.

Manufacturing Method

Figure 7:
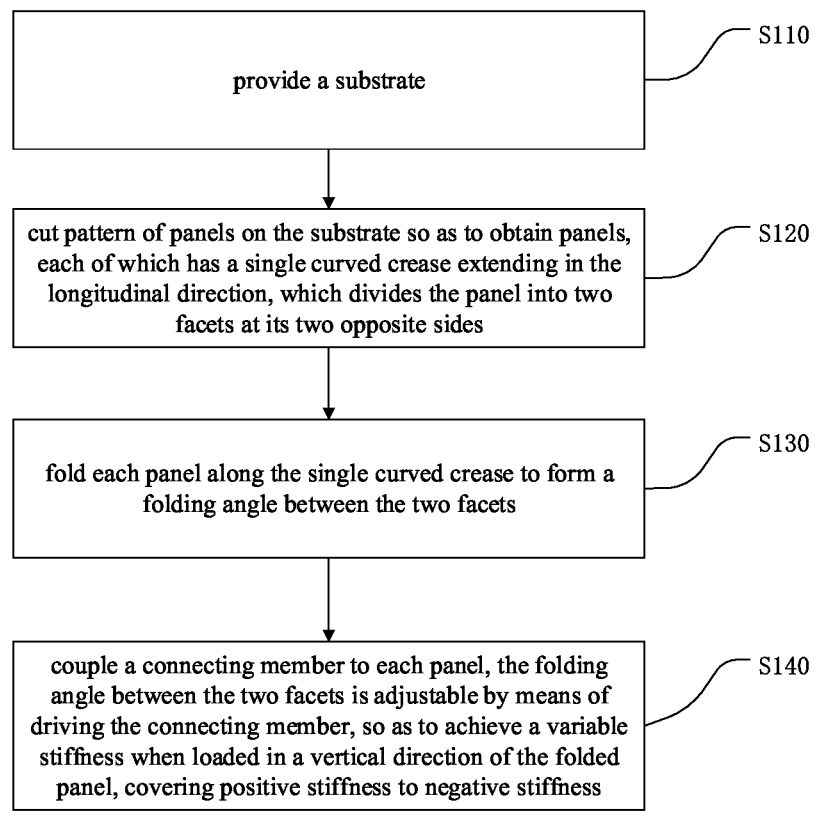
FIG. 7 and FIGS. 8a-8b show the process of the manufacturing method of the curved origami-based metamaterial according to an embodiment of the present disclosure.
Figure 8A:
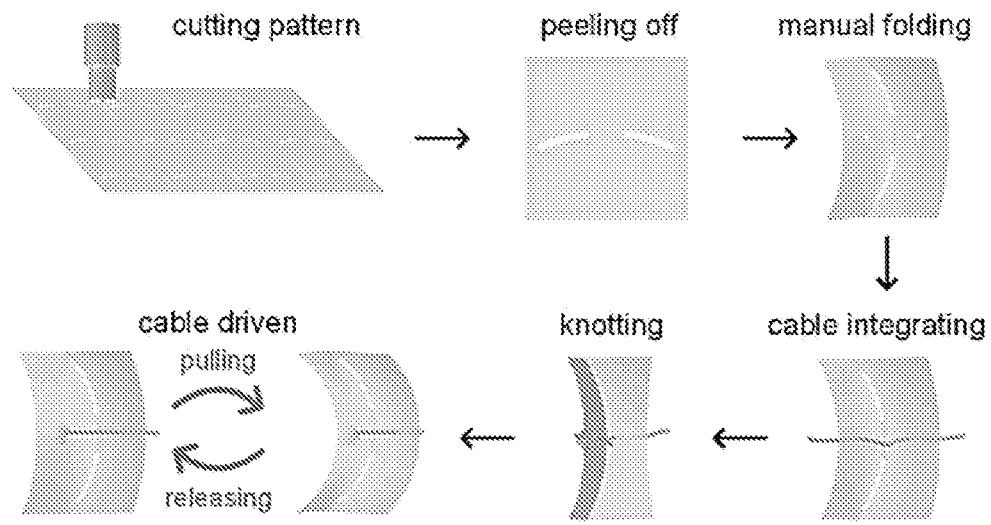
Figure 8B:
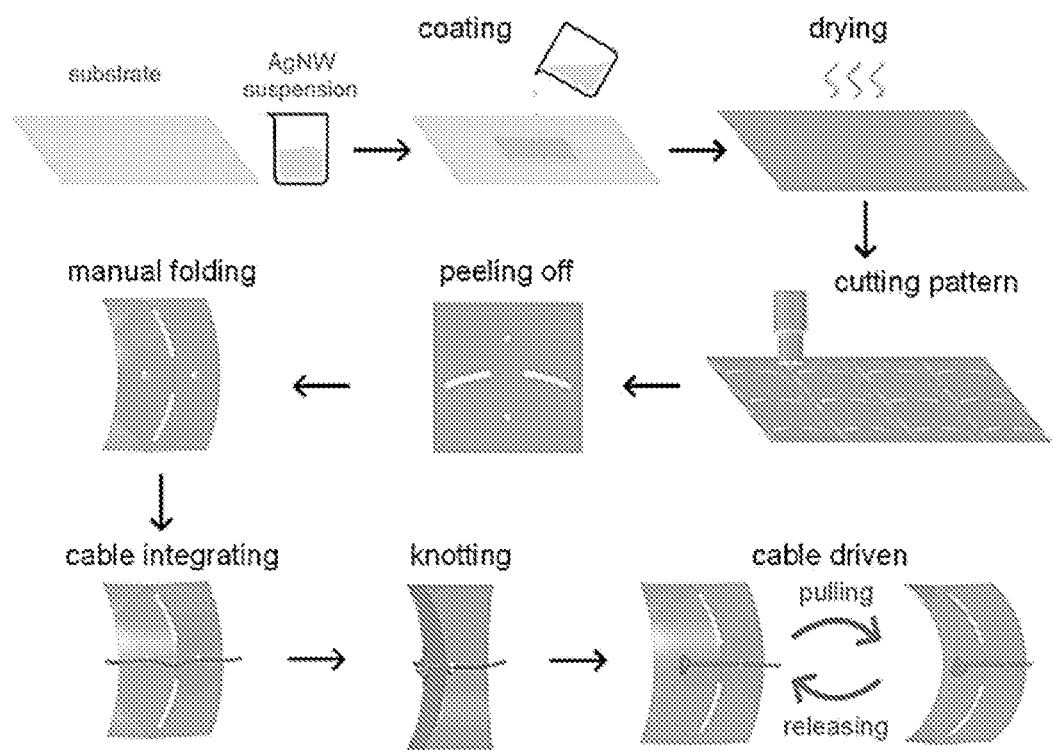

With reference to FIG. 7 and FIGS. 8a-8b, the manufacturing method of the curved origami-based metamaterial according to an embodiment of the present disclosure will be described below. When manufacturing the curved origami-based metamaterial, curved origami patterns are fabricated based on 2D machining and manual folding. In FIG. 7, the manufacturing method 100 comprises the following steps.

At step S110, the method comprises providing a substrate.

The substrate of multiple types of materials can be adopted to make curved origami patterns. Preferably, the substrate of the panel is made from plastics, metal, or alloy. Here, 0.2-mm in thickness PET (polyethylene terephthalate) films, as an example of the plastics, are used for the in-hand device (described later) and 0.15-mm in thickness 65 Mn spring steel sheets, as an example of the alloy, are used for the stepping device (described later).

At step S120, the method comprises cutting pattern of panels on the substrate so as to obtain panels, each of which has a single curved crease extending in the longitudinal direction, which divides the panel into two facets at its two opposite sides.

As illustrated in FIG. 8a, the pattern of panels comprises edges, the circular arc-shaped cutting slots, and the holes of the panels. The outlines and creases of the curved origami made of PET film are fabricated using a Silhouette Cameo 3 cutter (Silhouette America Inc.), and those made of spring steel are manufactured through an industrial engraving machine.

At step S130, the method comprises folding each panel along the single curved crease to form a folding angle between the two facets.

The initial manual folding forms the 3D configuration of the curved origami from the 2D sheets, and determines the initial folding angle.

At step S140, the method comprises coupling a connecting member to each panel, the folding angle between the two facets is adjustable by means of driving the connecting member, so as to achieve a variable stiffness when loaded in a vertical direction of the folded panel, covering positive stiffness to negative stiffness.

To actively control folding angle in real time for stiffness tuning, as shown in FIG. 8a, each panel also has a first hole and second hole located at two sides of the cutting slots, and the connecting member may be coupled to each panel as follows. Firstly, a cable may be used as the connecting member and passed through the first and second holes of each panel consequently so as to protrude the two sides of the cable out of the corresponding facets. Then, one side of the cable at the opposite side of the first hole to the second hole may be knotted, enabling the other side of the cable to be driven meanwhile being inhibited from passing through the first hole and the second hole.

Particularly, a cable (connecting member) is inserted through two holes, i.e., a first hole and a second hole, on panels of the curved origami, with one side knotted behind the panel. Note that the knot of the cable has a larger size than that of the first hole, so as to maintain against the first hole without passing therethrough when the other side of the cable is driven to decrease the folding angle. In this way, the motion of the moving panel can be controlled by pulling and releasing the inserted cable, and thus forming a tunable folding angle with respect to the fixed panel.

In a preferable embodiment, as shown in FIG. 8b, before cutting pattern of panels, a sensor layer for sensing the loaded strain and modify its electrical property is deposited on the substrate on the origami structure through a readily replicable coating method. Specifically, depositing a sensor layer on the substrate comprises: applying the suspension including the material of the sensor layer onto the substrate and drying the same under a vacuum oven at 120° C. for 6 hours. In a preferable embodiment, the sensor layer may adopt various materials, such as silver nanowires (AgNW, XFNano Inc.), grapheme, etc.

Applications

In an embodiment of the present disclosure, a curved origami-based haptic module is provided as an application of the curved origami-based metamaterial. The curved origami-based haptic module comprises at least one curved origami-based metamaterial and at least one connecting member as described above, wherein each panel is coupling to at least one connecting member, which is configured to be driven by a driving system to adjust the folding angle between the two facets of the corresponding panel, so as to achieve a variable stiffness when loaded in a vertical direction of the corresponding folded panel, covering positive stiffness to negative stiffness.

Figure 9:
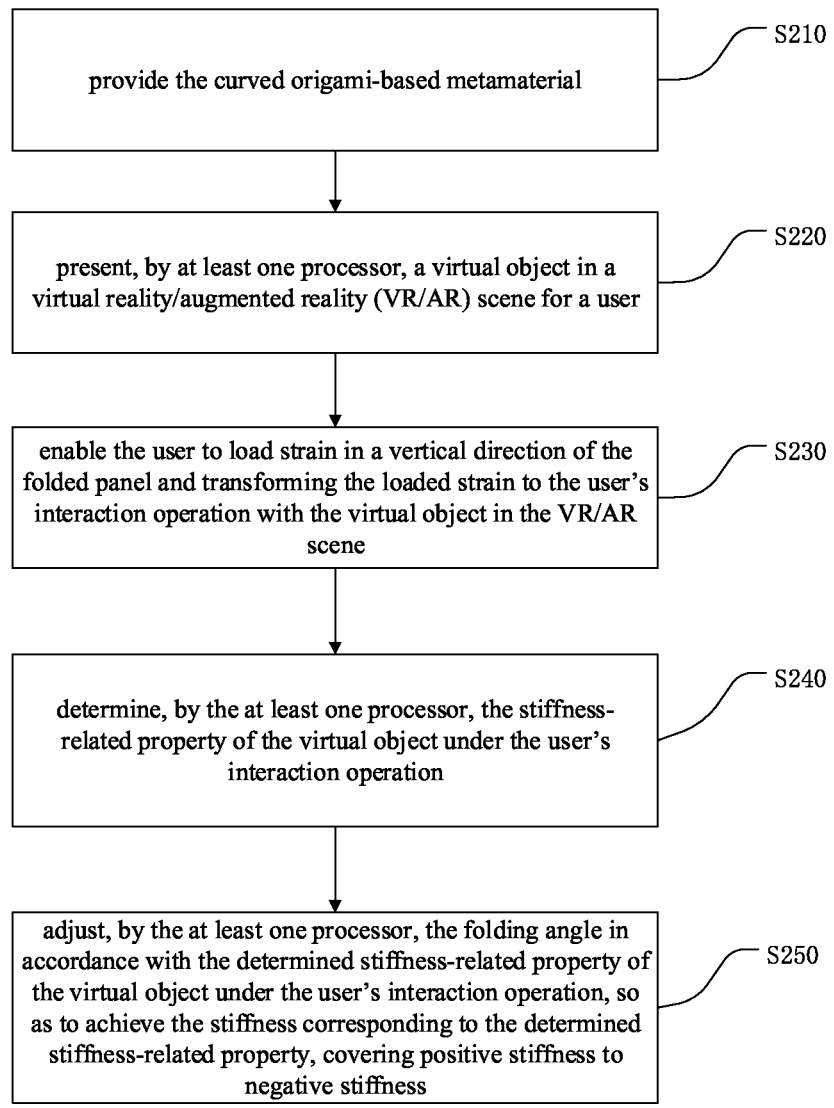
FIG. 9 shows the process of the method of producing active mechanical haptics according to an embodiment of the present disclosure.

Further, to build a two-way interface between the physical and virtual worlds, a closed-loop haptic is constructed using curved origami-based haptic module with the AgNWs-coated curved origami-based metamaterial as the media. With respect of FIG. 9, a method of producing active mechanical haptics is described. As shown in FIG. 9, the producing method 200 comprises the following steps.

At step S210, the curved origami-based metamaterial according to any embodiment of the present disclosure is provided.

Specifically, this step can be executed as presetting the curving angle between the tangent line at the end of curved crease and the normal line at the midpoint of the curved crease in a range between 55° and 85°, within which the folded panel is enabled to exhibit both positive and negative stiffness.

At step S220, by means of at least one processor, a virtual object is presented in a virtual reality/augmented reality (VR/AR) scene for a user.

At step S230, the user is enabled to load strain in a vertical direction of the folded panel and the loaded strain is transformed to the user's interaction operation with the virtual object in the VR/AR scene.

Specifically, this step can be executed by providing a pressing member on top of a plurality of the curved origami-based metamaterials, to displace the curved origami-based metamaterials in vertical direction accordingly upon pressing operation and/or releasing operation of the user on the pressing member; and the achieved stiffness corresponding to the determined stiffness-related property is perceivable by the user via the pressing member.

At step S240, by the at least one processor, the stiffness-related property of the virtual object under the user's interaction operation is determined.

At step S250, by the at least one processor, the folding angle is adjusted (tuned) in accordance with the determined stiffness-related property of the virtual object under the user's interaction operation, so as to achieve the stiffness corresponding to the determined stiffness-related property, covering positive stiffness to negative stiffness.

Specifically, in case that the determined stiffness-related property is hard or soft, the folding angle is tuned to enable the folded panel to exhibit positive stiffness; in case that the determined stiffness-related property is broken, or falling, the folding angle is tuned to a larger angle than that for positive stiffness, so as to enable the folded panel to exhibit negative stiffness.

Further, the method 200 can also comprises depositing the sensor layer on each panel, so that the user's pressing operation and/or releasing operation on the pressing member is sensed by the sensor layer as resistance changes; and converting the resistance changes into voltage variations. Then, the VR/AR processor may perform the following process: acquiring the voltage variations, determining the user's corresponding interaction operation with the virtual object in the VR/AR scene in accordance with the voltage variations, and presenting the user's corresponding interaction operation together with the virtual object in the VR/AR scene.

In an embodiment of the present disclosure, the user's corresponding interaction operation with the virtual object comprises breaking, crushing, or falling off the virtual object.

Figure 10A:
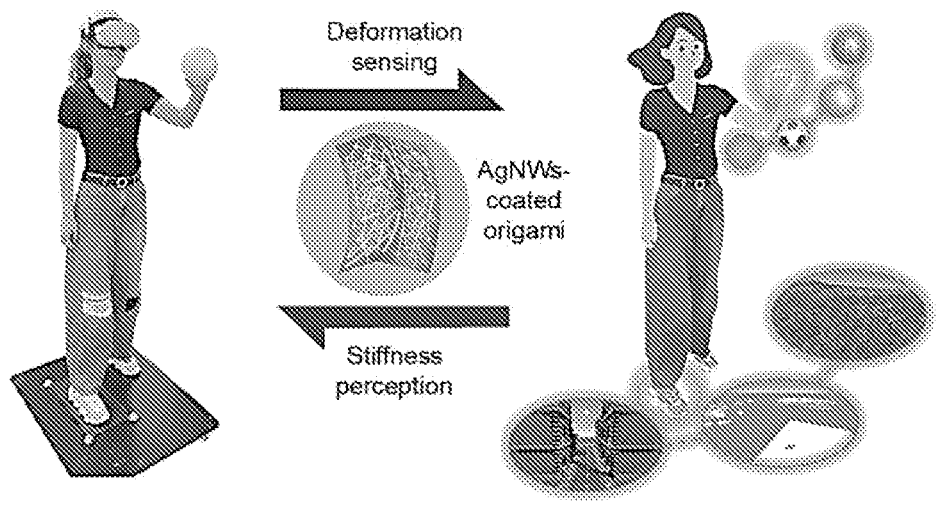
FIGS. 10a-10e show the produced closed-loop haptic based on curved origami-based metamaterial according to an embodiment of the present disclosure.
Figure 10B:
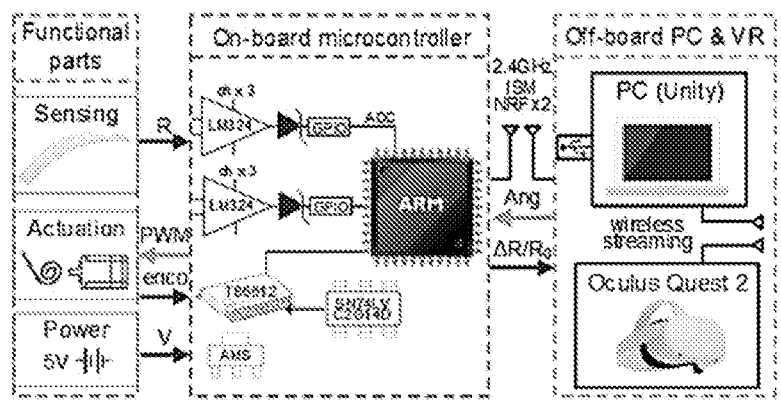
Figure 10C:
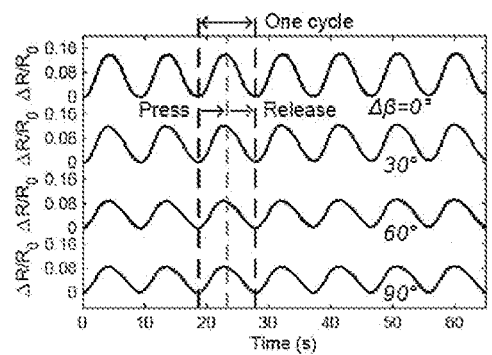
Figures 10D, 10E:
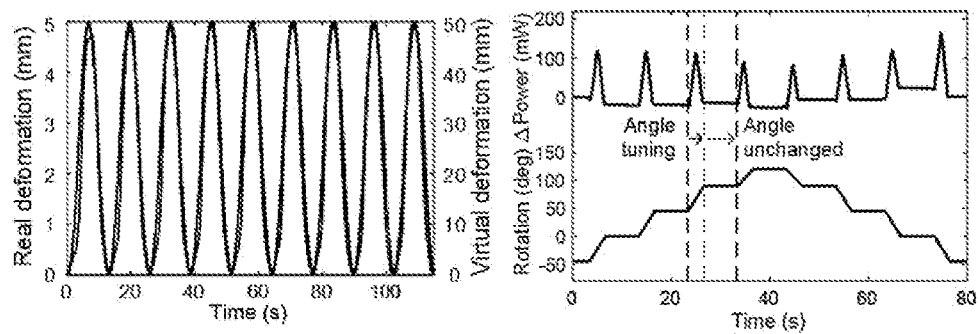

FIGS. 10a-10e shows the produced closed-loop haptic based on curved origami-based metamaterial respectively according to the embodiment of the present disclosure, wherein FIG. 10a illustrates schematics of the AgNW-coated curved origami-based metamaterial as an interface between physical and virtual environments, FIG. 10b illustrates system integration and circuit diagram for the haptic devices constructed with curved origami, FIG. 10c illustrates resistance of the coated AgNW sensing layers upon cyclic compressions at different folding angles of the curved origami with $\alpha=80°$ and $\beta=120°$, FIG. 10d illustrates deformation response of virtual objects triggered by actual deformation of the curved origami module upon active cyclic compression, demonstrating a highly synchronized deformation between the physical and virtual environments bridged by the curved origami, and FIG. 10e illustrates power consumption of the actuation system during the haptic process.

By combining the haptic perceptions generated from actively pressing the curved origami-based metamaterial with the synchronized visual information from conventional VR devices, a highly immersive, touchable, closed-loop virtual world can be constructed, as illustrated in FIG. 10a. Here, a user can actively and physically feel what she/he sees in VR by touching or pressing motions initiated by the user through haptic devices, with curved origami-based metamaterial as the key stiffness tuning component. The virtual scenarios (e.g., city view, ice surface, grassland, see FIG. 10a) act as an input to the haptic device (e.g., the mat and the ball in FIG. 10a). Based on this input, the folding angle $\beta$ is tuned by the integrated motor in $\Delta\beta$ to simulate the expected stiffness response of what the user sees in the VR device. Thus, the user can feel the mechanical stiffness of the objects seen in the VR device in real time through active hand-grasping or through body-centered, foot-stepping actions. On the other hand, the user's active interaction with the curved origami-based metamaterial (e.g., by pressing) is recorded as resistance change, which is achieved by way of silver nanowires (AgNWs) as a sensing layer deposited on the origami panel. Such changes are then converted into voltage variations using the on-board microcontroller (FIG. 10b). The voltage variations on the haptic device wirelessly communicates with the virtual environment engine (e.g., Unity) in a PC and then wirelessly streams into the VR device to render necessary changes in real time, such as breaking an icy surface while the user triggers a negative stiffness. Definitely, if the determined stiffness-related property of the virtual object under the user's interaction operation will result in change of the virtual object or its environment, the virtual environment engine may present the corresponding changed VR/AR scene for the user.

FIG. 10c presents the relative resistance variation ($\Delta R/R_0$) of the sensing layer upon cyclic and active pressing on top of the curved origami (with 30% nominal strain for the height change) at different folding angles ($\Delta\beta=0°$, 30°, 60° and 90° for $\beta=120°$. Here, two features are observed: first, the variation of the resistance has high repeatability during cyclic pressing and releasing, and second, folding angle $\Delta\beta$ shows a negligible influence, which is important to use a universal algorithm (i.e., $\Delta\beta$ independent algorithm) to alter the virtual environment. Thus, upon active human interaction, the virtual environment is changed according to the measured deformation through changes in electrical resistance. FIG. 10d shows that the device possesses very stable virtual-real synchronization via its wireless transmission system. Note that the integrated motor-driven cable is only activated when the folding angle of the curved origami needs to be altered according to the virtual scenario. It then provides the various stiffness perceptions to the user without the need for further complex control algorithms or additional actuation. Therefore, the power dissipation of about 150 mW is only produced when tuning the stiffness (FIG. 10e), leading to an energy-efficient system for human-triggered active haptics.

As specific examples of the curved origami-based haptic, an in-hand haptic device and a body-centered stepping device will be described below.

Figure 11A:
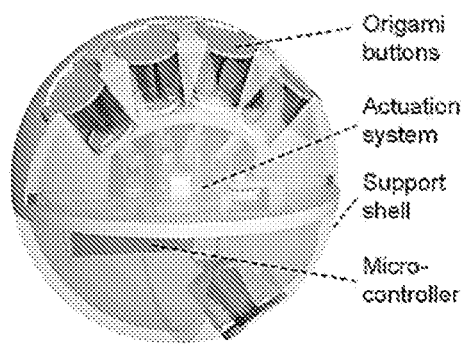
FIGS. 11a-11b shows the configuration and the working principle of the haptic in-hand device respectively according to an embodiment of the present disclosure.
Figure 11B:
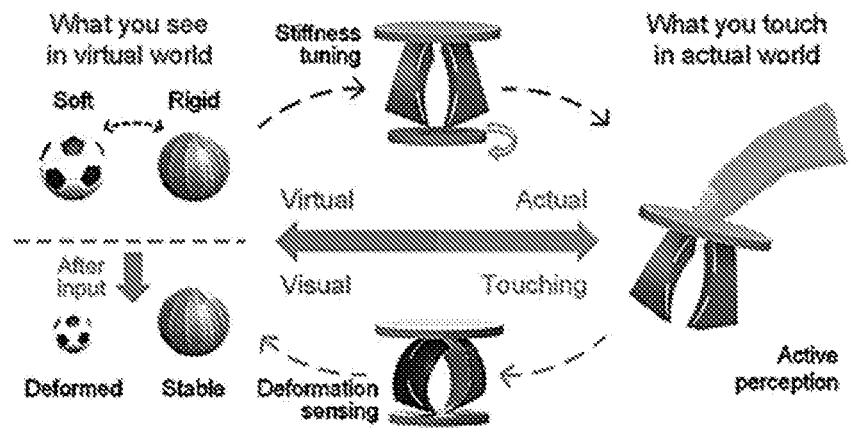

The object-like in-hand haptic device provides human-triggered, active mechanical haptics with stiffness perceptions covering positive and negative ranges. The device is composed of four main subsystems (FIG. 11a): 1) five buttons constructed with curved origami-based metamaterial for virtual-physical environment feedback generation upon a user's active pressing; 2) an actuation system to tune the stiffness of curved origami-based metamaterial by transmitting the motor rotation to the action of cable pulling/releasing; 3) electronic control components, i.e., micro controller, for the feedback loop (i.e., stiffness tuning, actuation, sensing) and wireless transmission; and 4) support shell for housing the buttons according to finger position, electronics, and ergonomic considerations for human grasping action. The curved origami module connects the virtual environment and actual perceptions and achieves what a user sees is what the user feels (FIG. 11b) sensation by synchronously providing various stiffness perceptions based on seen virtual objects and guiding their variations (not limited to shapes) in the virtual environment based on active user input through pressing buttons.

Figure 12A:
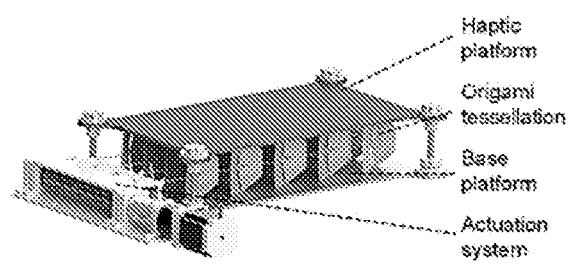
FIGS. 12a-12b shows the configuration and the working principle of the body-centered, lower limb-triggered stepping device respectively according to an embodiment of the present disclosure.
Figure 12B:
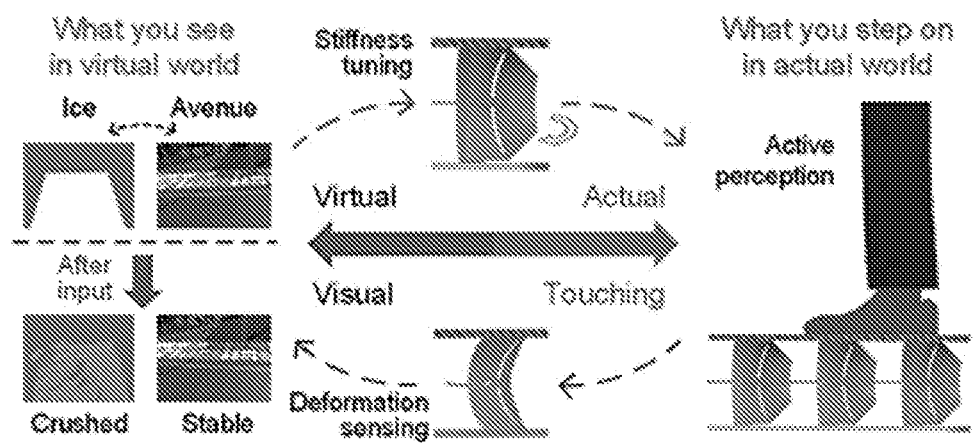

On the other hand, the body-centered, lower limb-triggered stepping device integrated with larger-scale curved origami-based metamaterial is developed to support the whole-body movement and to provide corresponding stiffness perceptions, which would further expand the immersive, active mechanical haptics beyond the hand-centered experience. The stepping device consists of four main subsystems (FIG. 12a): 1) a moving haptic platform for stepping interaction; 2) a curved origami tessellation for the user's weight supporting and feedback generation upon active stepping; 3) a base platform for locating origami tessellation and supporting the whole structure; 4) an actuation system to tune the stiffness of the curved origami by transmitting the motor rotation to the origami folding through cables. The two-step transmission of the parallel worm gears and multi-knotted cables enables simultaneous tuning of the stiffness of the curved origami tessellation, and for generating various closed-loop haptic perceptions. This device achieves what a user is immersed in is what the user steps on (FIG. 12b).

The active mechanical haptics based on the curved origami-based metamaterial introduced herein adopts delicate curved origami as a medium between the virtual and the physical environments to create human-centered, active haptic experiences with high-fidelity stiffness perceptions from positive to negative ranges. The presented mechanism shifts from existing machine-triggered, passive haptics to human-triggered interfaces that are closer to interactions with the physical universe. Moreover, newly introduced negative stiffness along with various positive stiffness can significantly enrich the immersive experiences of users in the virtual world by reproducing the heart-racing moment when crushing objects or missing steps, as well as touching and pressing objects with different hardness. The working principle and characteristics makes the system readily replicable in conjunction with its integration strategies. Two demonstration devices (i.e., in-hand device and stepping device) quantitatively validated that users can feel high-fidelity first-person sensory, physiological, and psychological experiences in the constructed highly immersive virtual environment, further affirming potential for the broad-spectrum use of the device.

The above description is intended to be illustrative and not limiting. For example, the above-mentioned examples (or one or more solutions thereof) may be used in combination with each other. For example, those of ordinary skill in the art may use other embodiments when reading the above-mentioned description. In addition, in the above-mentioned specific embodiments, various features may be grouped together to simplify the present disclosure. This should not be interpreted as an intention that features of the disclosure that do not require protection are necessary for any of the claims. Rather, the subject matter of the present disclosure may be less than the full range of features of a particular disclosed embodiment. Therefore, the following claims are incorporated herein as examples or embodiments in the particular embodiment, each claim stands alone as a separate embodiment, and it is contemplated that these embodiments may be combined with each other in various combinations or permutations. The scope of the present disclosure shall be determined by reference to the full scope of the appended claims and equivalent forms to which these claims are entitled.

The above embodiments are only exemplary embodiments of the present disclosure, and are not used to limit the present disclosure. The scope of protection of the invention is defined by the claims. Those skilled in the art can make various modifications or equivalent substitutions to the invention within the essence and protection scope of the disclosure, and such modifications or equivalent substitutions should also be regarded as falling within the protection scope of the invention.

What is claimed is:

1. A curved origami-based metamaterial, comprising:
a panel having a single curved crease extending in its longitudinal direction, which divides the panel into two facets at its two opposite sides;
the panel is configured to be folded along the single curved crease to form a folding angle between the two facets;
wherein, the folding angle is configured to be adjustable to achieve a variable stiffness when loaded in a vertical direction of the folded panel, covering positive stiffness to negative stiffness,
wherein the single curved crease is configured by a circular arc-shaped cutting slot at a portion thereof, and
wherein the single curved crease is configured by the following portions: two end extending portions, an intermediate extending portion, and two circular arc-shaped cutting slots, each of which connects its adjacent end extending portion and the intermediate extending portion.

2. The curved origami-based metamaterial of claim 1, wherein the cutting slot includes a cutting line.

3. The curved origami-based metamaterial of claim 1, wherein the curving angle between the normal line at the midpoint of the curved crease and the tangent line at the end of the curved crease is fixed.

4. The curved origami-based metamaterial of claim 1, wherein the folded panel is configured to exhibit both positive and negative stiffness when the folding angle is in a first angle range but exhibit only positive stiffness when the folding angle is in a second angle range, wherein the first angle range is larger than the second angle range meanwhile larger than an angle threshold.

5. The curved origami-based metamaterial of claim 4, wherein the folded panel is configured to exhibit negative stiffness when the pressed vertical displacement is more than a first displacement threshold but exhibit positive stiffness when the pressed vertical displacement is less than the first displacement threshold, in case that the folding angle is in the first angle range.

6. The curved origami-based metamaterial of claim 4, wherein the stiffness of the folded panel changes as a function of the material of the panel, the geometry of the panel, the folding angle, and the curving angle between the normal line at the midpoint of the curved crease and the tangent line at the end of the curved crease.

7. The curved origami-based metamaterial of claim 1, wherein the stiffness of the folded panel changes as a function of the material of the panel, the geometry of the panel, the arrangement of the cutting slots, the folding angle, and the curving angle between the normal line at the midpoint of the curved crease and the tangent line at the end of the curved crease.

8. The curved origami-based metamaterial of claim 1, wherein the curving angle between the tangent line at the end of curved crease and the normal line at the midpoint of the curved crease is set in a range between 55° and 85°, and the folding angle is adjusted between 30° and 130°.

9. The curved origami-based metamaterial of claim 1, wherein the panel is made from plastics, metal, or alloy.

10. The curved origami-based metamaterial of claim 9, wherein the panel is made of a substrate of plastics, metal, or alloy deposited with a sensor layer for sensing the loaded strain and modify its electrical property.

11. The curved origami-based metamaterial of claim 9, wherein a first hole is cut in one of the two facets while a second hole is cut in the other of the two facets, for a connecting member to pass through the two holes consequently, so as to perform pulling operation for decreasing the folding angle or releasing operation for increasing the folding angle.

12. The curved origami-based metamaterial of claim 11, wherein at least one of the first hole and the second hole is sized for inhibiting a knotted portion of the connecting member from passing therethrough.

13. The curved origami-based metamaterial of claim 11, wherein the connecting member includes a cable.

14. A method of manufacturing a curved origami-based metamaterial, comprising:
   providing a substrate;
   cutting a pattern of panels on the substrate so as to obtain panels, each of which has a single curved crease extending in the longitudinal direction, which divides the panel into two facets at its two opposite sides;
   folding each panel along the single curved crease to form a folding angle between the two facets; and
   coupling a connecting member to each panel, the folding angle between the two facets is adjustable by means of driving the connecting member, so as to achieve a variable stiffness when loaded in a vertical direction of the folded panel, covering positive stiffness to negative stiffness.

15. The method of claim 14, wherein the single curved crease is configured by circular arc-shaped cutting slots at a portion thereof.

16. The method of claim 15, wherein each panel also has a first hole and second hole located at two sides of the cutting slots;
   coupling a connecting member to each panel further comprising:
   passing a cable as the connecting member through the first and second holes of each panel consequently so as to protrude the two sides of the cable out of the corresponding facets; and
   knotting one side of the cable at the opposite side of the first hole to the second hole, enabling the other side of the cable to be driven.

17. The method of claim 16, wherein the knot of the cable has a larger size than that of the first hole, so as to maintain against the first hole without passing therethrough when the other side of the cable is driven to decrease the folding angle.

18. The method of claim 14, further comprising: before cutting pattern of panels, depositing a sensor layer for sensing the loaded strain and modify its electrical property on the substrate.

19. The method of claim 18, wherein depositing a sensor layer on the substrate further comprising: applying the suspension including the material of the sensor layer onto the substrate and drying the same.

20. The method of claim 16, wherein the pattern of panels comprising edges, the circular arc-shaped cutting slots, and the holes of the panels.

21. The method of claim 15, wherein for each panel, two circular arc-shaped cutting slots are cut out so that between the two cutting slots there is an intermediate extending portion and each cutting slot has an adjacent end extending portion.

22. The method of claim 15, wherein the panels are cut out in an initial rectangular shape with a horizontal bottom edge, and the circular arc-shaped cutting slots are cut out with the normal line at the midpoint thereof parallel to the horizontal bottom edge, the curving angle between the tangent line at the end of the cutting slots or the curved crease and the horizontal bottom edge is set in a range between 55° and 85°.

23. The method of claim 14, wherein the substrate is made from plastics, metal, or alloy.

24. A method of producing active mechanical haptics, the method comprising:
   providing the curved origami-based metamaterial of claim 1;
   presenting, by at least one processor, a virtual object in a virtual reality/augmented reality (VR/AR) scene for a user;
   enabling the user to load strain in a vertical direction of the folded panel and transforming the loaded strain to the user's interaction operation with the virtual object in the VR/AR scene;
   determining, by the at least one processor, the stiffness-related property of the virtual object under the user's interaction operation; and
   adjusting, by the at least one processor, the folding angle in accordance with the determined stiffness-related property of the virtual object under the user's interaction operation, so as to achieve the stiffness corresponding to the determined stiffness-related property, covering positive stiffness to negative stiffness.

25. The method of claim 24, wherein adjusting the folding angle in accordance with the determined stiffness-related property of the virtual object further comprising:
   in case that the determined stiffness-related property is hard or soft, adjusting the folding angle to enable the folded panel to exhibit positive stiffness;
   in case that the determined stiffness-related property is broken, or falling, adjusting the folding angle at a larger angle than that for positive stiffness, so as to enable the folded panel to exhibit negative stiffness.

26. The method of claim 24, further comprising:
   if the determined stiffness-related property of the virtual object under the user's interaction operation will result in change of the virtual object or its environment, presenting, by the at least one processor, the corresponding changed VR/AR scene for the user.

27. The method of claim 25, wherein enabling the user to load strain in a vertical direction of the folded panel further comprising:
   providing a pressing member on top of a plurality of the curved origami-based metamaterials, to displace the curved origami-based metamaterials in vertical direction accordingly upon pressing operation and/or releasing operation of the user on the pressing member;

and the achieved stiffness corresponding to the determined stiffness-related property is perceivable by the user via the pressing member.

28. The method of claim 27, further comprising:

depositing the sensor layer on each panel, so that the user's pressing operation and/or releasing operation on the pressing member is sensed by the sensor layer as resistance changes;

converting the resistance changes into voltage variations; and performing the following process by the VR/AR processor: acquiring the voltage variations, determining the user's corresponding interaction operation with the virtual object in the VR/AR scene in accordance with the voltage variations, and presenting the user's corresponding interaction operation together with the virtual object in the VR/AR scene.

29. The method of claim 28, wherein the user's corresponding interaction operation with the virtual object comprises breaking, crushing, or falling off the virtual object.

30. The method of claim 24, wherein providing the curved origami-based metamaterial further comprising: presetting the curving angle between the tangent line at the end of curved crease and the normal line at the midpoint of the curved crease in a range between 55° and 85°, within which the folded panel is enabled to exhibit both positive and negative stiffness.

31. A curved origami-based haptic module, comprising:

at least one curved origami-based metamaterial of claim 1, and at least one connecting member, wherein each panel is coupling to at least one connecting member, which is configured to be driven by a driving system to adjust the folding angle between the two facets of the corresponding panel, so as to achieve a variable stiffness when loaded in a vertical direction of the corresponding folded panel, covering positive stiffness to negative stiffness.

32. The curved origami-based haptic module of claim 31, wherein for each curved origami-based metamaterial, a first hole is cut in one facet while a second hole is cut in the other facet;

the connecting member includes a cable, which is configured to pass through the first and second holes consequently, so as to be pulled by the driving system to decrease the folding angle or released by the driving system to increase the folding angle.

* * * * *